United States Patent [19]

Urbaitis

[11] 4,054,298
[45] Oct. 18, 1977

[54] STEP MEMBER FOR TRACTOR

[75] Inventor: Vincas Urbaitis, Mayfield Heights, Ohio

[73] Assignee: General Motors Corporation, Detroit, Mich.

[21] Appl. No.: 692,656

[22] Filed: June 4, 1976

[51] Int. Cl.² ............................................. B60R 3/00
[52] U.S. Cl. ...................................... 280/163; 182/90
[58] Field of Search ................. 280/163, 166; 182/86, 182/196, 90, 197

[56] References Cited

U.S. PATENT DOCUMENTS

| | | | |
|---|---|---|---|
| 199,967 | 2/1878 | Elton | 182/196 |
| 2,365,012 | 12/1944 | Schneider | 182/197 |
| 3,887,216 | 6/1975 | Perry | 280/163 |
| 3,967,695 | 7/1976 | Waddell | 280/166 |

*Primary Examiner*—Robert R. Song
*Attorney, Agent, or Firm*—Edward J. Biskup

[57] ABSTRACT

A step member for attachment to the frame of a tractor. The step member includes a pair of flexible cables each of which has a coupling member at the lower end thereof that extends through an enlarged aperture in a foot supporting portion and serves to connect the latter to the cables so as to permit limited movement of the foot supporting portion relative to the coupling members. The upper ends of the cables are pivotally connected to the frame in a manner that allows the foot supporting portion to swing in a plane parallel to the longitudinal axis of the tractor when the foot supporting portion encounters an obstacle.

2 Claims, 3 Drawing Figures

STEP MEMBER FOR TRACTOR

This invention concerns a step assembly which can be utilized with a tractor and more specifically a step member that is intended for use with an overhung rubber tired tractor commonly employed with a scraper.

In the preferred form, the step member according to the invention comprises a horizontal foot supporting plate which has an enlarged aperture formed adjacent each end thereof. The foot supporting plate is connected to the lower ends of a pair of flexible cables through a pair of coupling members each of which has a projection that extends through one of the apertures in the supporting plate and is of a size that allows limited pivotal movement of the coupling members relative to the supporting plate. A cap is secured to each projection below the foot supporting plate for connecting the latter to the cables, and a pair of L-shaped brackets are provided for connecting the upper ends of the cables to the outer surface of the exposed lower frame portion of a tractor. Each of the brackets has a vertical leg and a horizontal leg with the vertical leg being pivotally connected to the frame while the horizontal leg is rigidly fixed with the upper end of the associated cable so as to laterally space the cable from the frame. The arrangement is such that the brackets permit the foot supporting plate to freely pivot in a vertical plane that is parallel to the longitudinal center axis of the tractor so when the latter is moving in a fore and aft direction, the foot supporting plate is not damaged if it encounters an obstacle.

The objects of the present invention are to provide a new and improved step member for a tractor that includes a pair of flexible cables with the upper ends of the cables being pivotally secured to the frame through brackets which space the cables laterally outwardly from the frame; to provide a new and improved step member having a foot supporting plate which is connected to a pair of flexible cables through coupling members which allow the foot supporting plate to move axially along the longitudinal axis of each of the cables and which also permit pivotal movement of the foot supporting plate relative to the coupling members; and to provide a new and improved step member for a tractor which includes flexible cables for supporting a foot supporting plate and is mounted to the outer side wall of a tractor frame through brackets which allow pivotal movement of each of the cables so that damage to the foot supporting plate is minimized when it encounters an obstacle.

Other objects and advantages of the present invention will be more apparent from the following detailed description when taken with the drawings in which.

Figure 1:
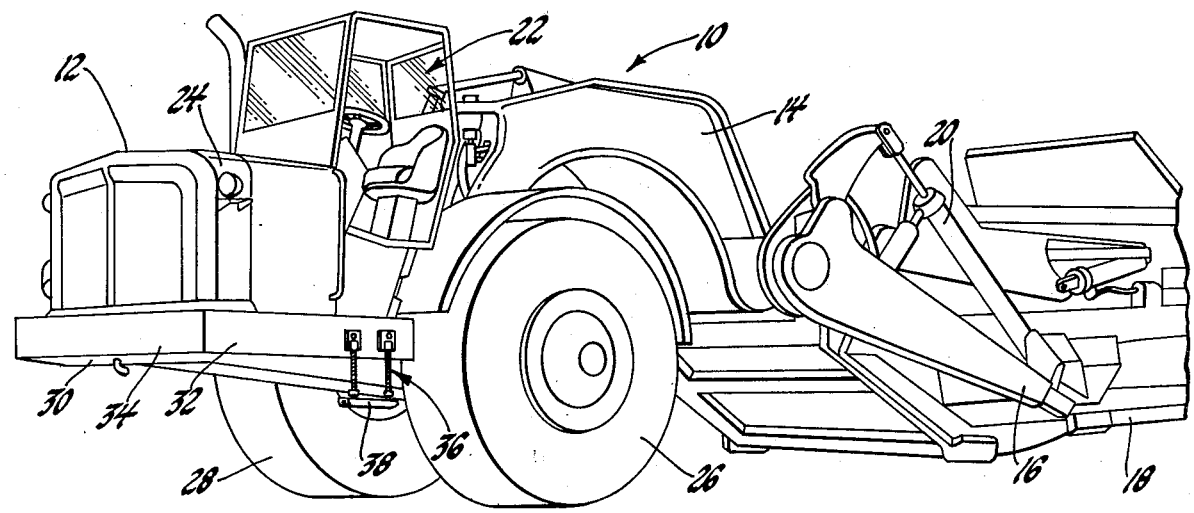
FIG. 1 shows an overhung off-highway scraper incorporating a step member made in accordance with the invention.

Referring to the drawing and particularly FIG. 1, it will be noted that an off-highway scraper 10 is shown including the usual overhung tractor 12 which is connected by a goose neck 14 to a pull arm assembly 16 which supports a trailing scraper bowl 18 for movement between a lowered dig-position and a raised carry-position as controlled by a lift cylinder 20 carried by the pull arm assembly 16. The tractor 12 has an operator's station 22 located to the rear of a power plant compartment 24 which houses the usual engine (not shown) for providing drive to the laterally spaced wheels 26 and 28. A frame 30 supports the engine and other components which make up the drive train and includes side and front channel members respectively identified by the reference numeral 32 and 34. As is well known, because of the size of vehicles of this type, it is extremely difficult for the driver to get to the operator's station 22 and accordingly, in order to facilitate ingress and egress a step member 36 made in accordance with the invention is connected to the tractor 12 below the operator's station 22 and is attached to the outer vertical surface 37 of the longitudinally extending side channel member 32 which forms a part of the frame 30.

Figure 2:
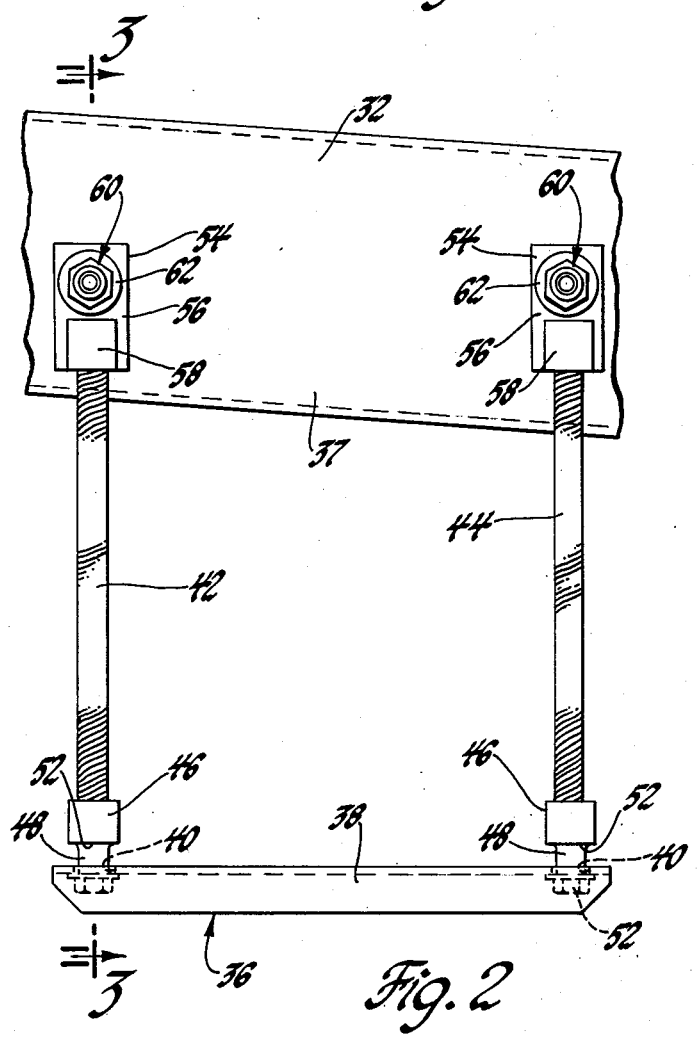
FIG. 2 is an enlarged view of the step member.
Figure 3:
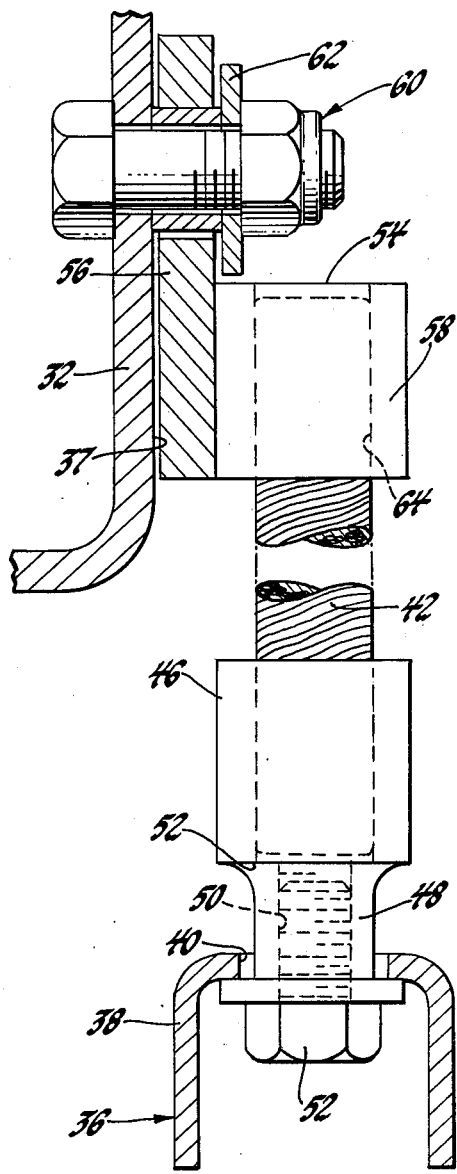
FIG. 3 is a further enlarged view of the step member taken on line 3—3 of FIG. 2.

As seen in FIGS. 2 and 3, the step member 36 comprises a horizontal foot supporting plate 38 that is U-shaped in cross section and provided with a circular aperture 40 adjacent each end thereof. The foot supporting plate 38 is intended to be made from steel, and although not shown, will have a tread pattern formed on the upper surface thereof. A pair of flexible cables 42 and 44 serve to connect the foot supporting plate 38 to the tractor 12 with the lower end of each cable being rigidly connected to a coupling member 46 which is formed with a projection 48 that extends through the associated aperture 40 in the foot supporting plate 38 as seen in FIGS. 2 and 3. It will be noted that the projection 48 on each coupling member 46 is cylindrical in cross section and is of a size less than the size of the associated aperture 40.

The projection 48 has a tapped bore 50 formed therein which serves to accommodate a cap screw 52 for maintaining the foot supporting plate 38 onto the coupling member. The coupling member 46 in each instance is also formed with an enlarged shoulder 52 so that, together with the cap screw, only limited movement of the foot supporting plate 38 is permitted along the longitudinal axis of the associated cable. In addition, the size relationship between the projection 48 and the aperture 40 is such that it allows relative pivotal movement of each end of the foot supporting plate 38 relative to the associated coupling member 46.

The upper end of each of the cables 42 and 44 is secured to an L-shaped bracket 54 which includes a vertical leg 56 and a horizontal leg 58 which are rigidly interconnected. The vertical leg 56 is pivotally secured to the outer vertical surface 37 of the side channel member 32 through a bolt assembly 60 which includes a bushing member 62 while the horizontal leg 58 is generally cylindrical in shape and has an opening 64 formed therein which rigidly accommodates the upper end of the associated cable. The brackets 54 serve to pivotally connect the cables 42 and 44 to the side member 32 at points horizontally spaced along the side channel member 32 a distance equal to the distance between the apertures 40 formed in the foot supporting plate 38.

From the above description, it should be apparent that the step member 36 is connected to the side channel member 32 in a manner which allows the foot supporting plate 38 to pivot about the horizontally spaced pivotal connections provided by the bolt assemblies 60 whenever the foot supporting plate 38 encounters an obstacle. A step member made according to the invention that has been tested and which has been found to perform successfully under adverse conditions had the cable portions 42 and 44 formed from a ¾ inches 6×19 I.W.R.C. right lang lay performed steel cable purchased from Bethlehem Steel Co. with each cable portion having a length of approximately 13.70 inches. The foot supporting plate 38 was formed from 10 gauge sheet metal and had an overall length of 14½ inches with the spacing between the centers of the apertures 40 and the bolt assemblies 60 being 12.50 inches. The width of the foot supporting plate measured approximately 1.50 inches, and the diameter of each of the apertures 40 was 0.88 inches. The upper surface of the foot supporting plate 38 was formed with a tread grip pattern by punching openings into the outer surface and each depending leg of the foot supporting plate as seen in FIG. 3 measured 1.25 inches. The projection 48 on each coupling member 46 had a diameter of 0.75 inches and had a length of approximately 1.0 inches. The upper end of each coupling member 46 was swaged to the associated cable and to the horizontal leg 58 of the associated bracket 54 so as to provide a 5,000 lb. tensile strength. The horizontal leg 58 spaced the center of the associated cable from the outer surface 37 of the frame a distance of approximately 1.00 inch from the frame surface.

It will be noted that by utilizing the flexible cables with the step member 36 and by providing coupler members and pivoted L-shaped brackets as described above, not only does the foot supporting plate 38 have capabilities of pivoting in a vertical plane parallel to the longitudinal axis of the tractor when it encounters large obstacles, but it also has the ability to pivot about a vertical axis due to the flexibility of the cables. At the same time, the cables provide sufficient rigidity to allow a firm step for the operator. Thus, when the scraper operator places his foot onto the foot supporting plate 38 of the step member 36 and proceeds to climb towards the operator's station 22, the horizontal component of the load applied to the step member will be resisted by both cables 42 and 44. Any limited swinging movement towards the side channel member 32 is offset somewhat by the fact that the cables are spaced laterally outwardly from the outer vertical surface 37 of the frame 30. Also, during operation of the scraper 10, if the tractor 12 should encounter any large obstacles which could cause damage or breakage to any part depending from the frame 30, the pivoting capabilities of the step member 36 will permit the latter to move as explained above without damage thereto.

Various changes and modifications can be made in this construction without departing from the spirit of the invention. Such changes and modifications are contemplated by the inventor and he does not wish to be limited except by the scope of the appended claims.

I claim:

1. In a tractor having an exposed lower frame portion susceptible to encountering obstacles and having a vertically oriented outer surface, a step member attached to and depending from said frame portion, said step member comprising a horizontal foot supporting plate having an aperture formed adjacent each end of the supporting plate, a pair of flexible cables, each of said cables having the lower end thereof rigidly fixed with a coupling member having a projection that extends through one of the apertures in supporting plate and is of a size that allows limited pivotal movement of the coupling member relative to the supporting plate, a cap secured to each projection below said foot supporting plate for connecting the latter to the cables, a pair of L-shaped brackets for connecting the upper ends of said cables to said outer surface of the frame portion, each of said L-shaped brackets having a vertical leg and a horizontal leg, a pivotal connection for connecting the vertical leg to said outer surface with the horizontal leg being rigidly fixed with the upper end of the associated cable so as to laterally space said cable from the outer surface, the arrangement being such that said foot supporting plate is free to pivot in a vertical plane about the pivotal connection of each vertical leg of said pair of brackets when the tractor is moving in a fore or aft direction and the foot supporting plate encounters an obstacle.

2. In a tractor having an exposed lower frame portion susceptible to encountering obstacles and having a vertically oriented outer surface, a step member attached to and depending from the outer surface of said frame portion, said step member comprising a horizontal foot supporting plate having an aperture formed adjacent each end of the supporting plate, said foot supporting plate being U-shaped in cross section and having a pair of depending legs, a pair of flexible cables, each of said cables having the lower end thereof rigidly fixed with a coupling member having a projection that extends through one of the apertures in supporting plate and is of a size that allows limited pivotal movement of the coupling member relative to the supporting plate, a cap secured to each projection between said depending legs of said foot supporting plate for connecting the latter to the cables, a pair of L-shaped brackets for connecting the upper ends of said cables to said outer surface of the frame portion, each of said L-shaped brackets having a vertical leg and a horizontal leg, a pivotal connection connecting the vertical leg to said outer surface with the horizontal leg being rigidly fixed with the upper end of the associated cable so as to laterally space said cable from the outer surface, the arrangement being such that said foot supporting plate is free to pivot in a vertical plane about the pivotal connection of each vertical leg of said pair of brackets when the tractor is moving in a fore or aft direction and the foot supporting plate encounters an obstacle.

* * * * *